(12) United States Patent
Campbell et al.

(10) Patent No.: US 8,479,771 B2
(45) Date of Patent: Jul. 9, 2013

(54) DIVERTER VALVE

(75) Inventors: Graham J. Campbell, Stevenson Ranch, CA (US); Luis E. Fuentes, Santa Clarita, CA (US); Jason W. Hillyard, Fillmore, CA (US)

(73) Assignee: G-G Distribution and Development Co., Inc., Valencia, CA (US)

( * ) Notice: Subject to any disclaimer, the term of this patent is extended or adjusted under 35 U.S.C. 154(b) by 621 days.

(21) Appl. No.: 12/276,200

(22) Filed: Nov. 21, 2008

(65) Prior Publication Data
US 2010/0126613 A1 May 27, 2010

(51) Int. Cl.
*F16K 11/085* (2006.01)

(52) U.S. Cl.
USPC ...... 137/625.47; 137/625; 251/162; 251/163; 251/192

(58) Field of Classification Search
USPC ... 137/625.46, 625.47, 625, 238; 251/129.02, 251/192, 158–169
See application file for complete search history.

(56) References Cited

U.S. PATENT DOCUMENTS

| | | | | |
|---|---|---|---|---|
| 2,290,332 A * | 7/1942 | Johnson | | 251/160 |
| 3,742,975 A | 7/1973 | Kazama et al. | | |
| 3,826,462 A | 7/1974 | Taylor | | |
| 4,073,471 A * | 2/1978 | Lehtinen | | 251/176 |
| 4,470,429 A * | 9/1984 | Johnson | | 137/270 |
| 4,718,444 A | 1/1988 | Boelte | | |
| 4,770,392 A * | 9/1988 | Schmidt | | 251/158 |
| 4,774,977 A * | 10/1988 | Cohen | | 137/271 |
| 5,181,540 A * | 1/1993 | Campau | | 137/625.46 |
| 5,226,454 A * | 7/1993 | Cabalfin | | 137/870 |
| 5,330,157 A | 7/1994 | Dern et al. | | |
| 5,582,200 A | 12/1996 | Kimpel et al. | | |
| 5,794,653 A * | 8/1998 | DeSmet et al. | | 137/486 |
| 6,027,098 A | 2/2000 | Nevrekar | | |
| 6,076,554 A * | 6/2000 | Jensen et al. | | 137/625.47 |
| 6,378,841 B1 | 4/2002 | Russell | | |
| 6,405,995 B1 | 6/2002 | Spain | | |
| 6,497,250 B1 * | 12/2002 | Johann | | 137/625.46 |
| 6,805,332 B2 | 10/2004 | Crawley | | |
| 6,878,293 B1 | 4/2005 | Portyrata et al. | | |
| 7,051,994 B2 * | 5/2006 | Carlson | | 251/162 |
| 2004/0045613 A1 * | 3/2004 | Hinojosa et al. | | 137/625.47 |

FOREIGN PATENT DOCUMENTS

JP 07042850 2/1995

* cited by examiner

*Primary Examiner* — John Fox
*Assistant Examiner* — Seth Faulb
(74) *Attorney, Agent, or Firm* — Larry K. Roberts

(57) ABSTRACT

An exemplary embodiment of a diverter valve system includes a valve body defining an internal chamber having at least first, second and third ports, and a first valve seat associated with the first port and a second valve seat associated with the second port. A valve shaft structure includes an internal shaft portion positioned within the internal chamber, the valve shaft structure configured for rotation about a valve axis through a range of motion. A diverter structure includes a diverter face portion configured to seat against the first valve seat when in a first rotational position and against the second valve seat when in a second position, and a mounting portion configured to mount on the internal shaft portion of the valve shaft structure.

16 Claims, 10 Drawing Sheets

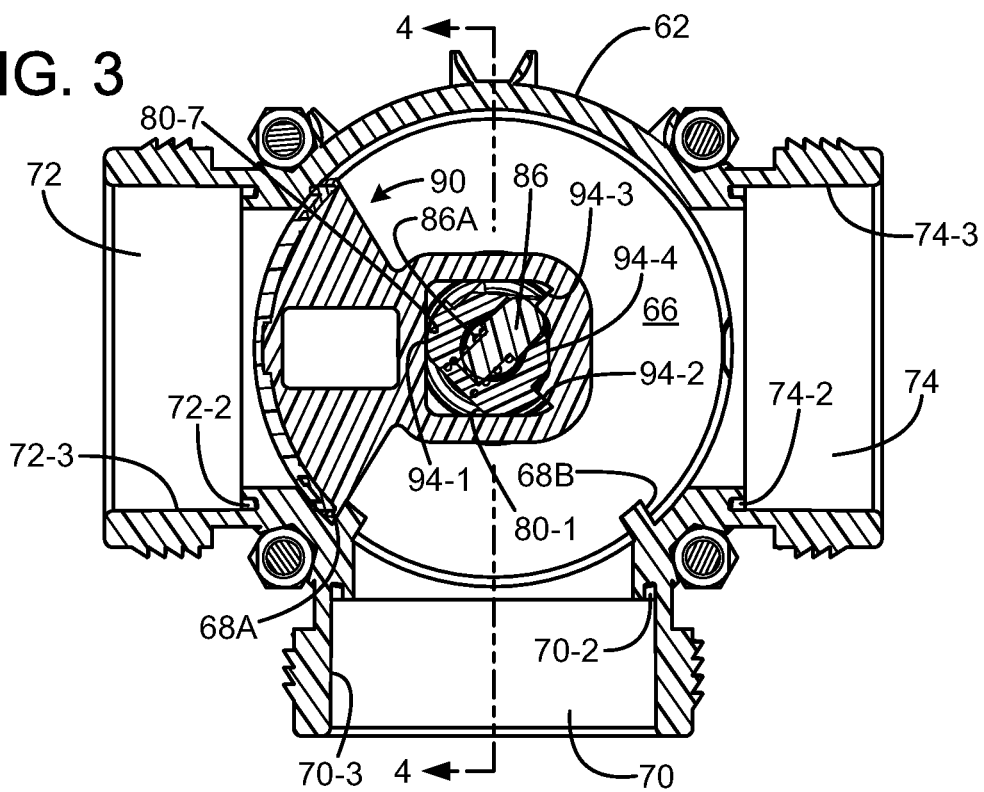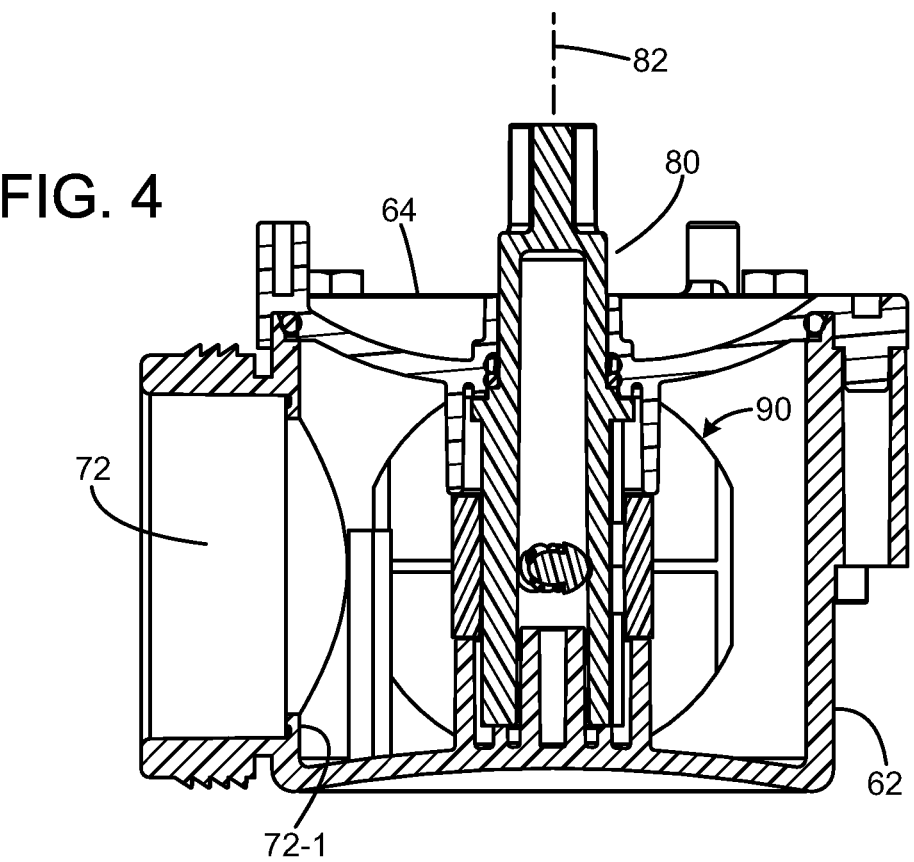

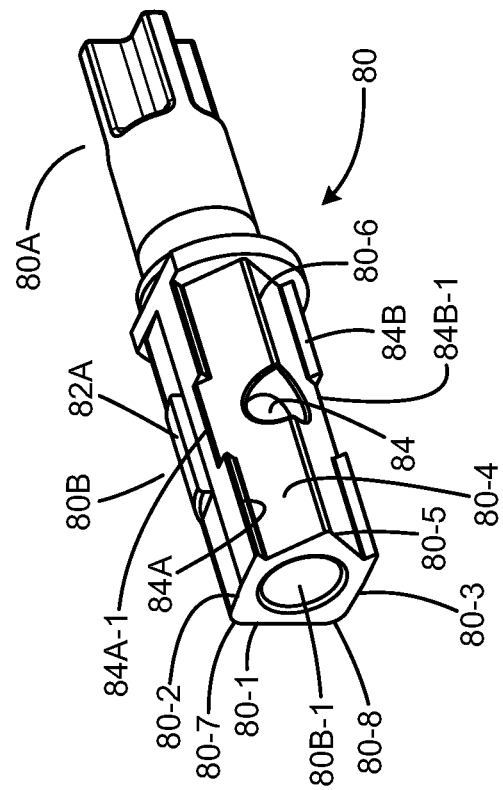
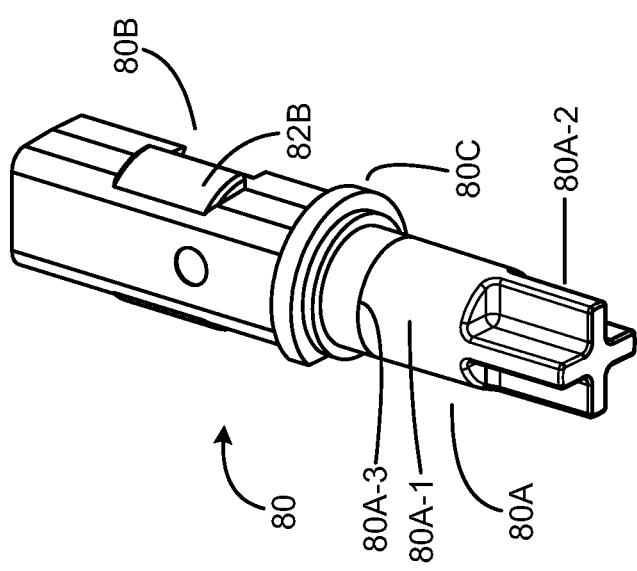
FIG. 7B
FIG. 7A

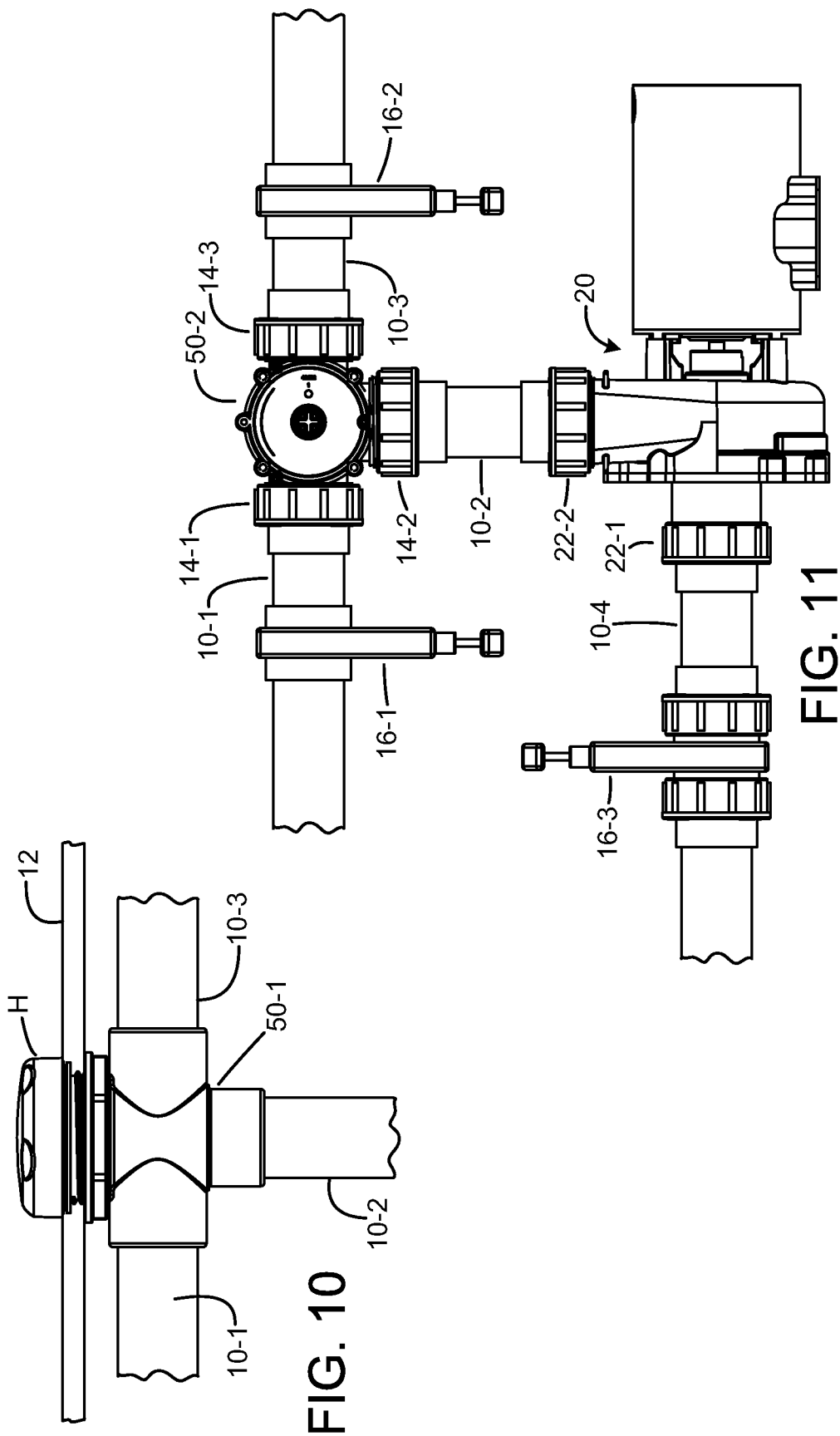

DIVERTER VALVE

BACKGROUND

Diverter valves are used in many applications involving water flow paths, typically to direct flow from one path to another. Exemplary applications include bathing installations such as spas, pools and whirlpool baths. Bathing installations typically employ water pumps to pump water through water flow paths, and diverter valves may selectively divert water through jets, filters, and other devices or water paths.

Diverter valves are susceptible to problems resulting from foreign matter in the water, e.g. dirt particles, which may for example prevent the valve from proper operation.

BRIEF DESCRIPTION OF THE DRAWINGS

FIG. 3 is a cross-sectional view of the diverter valve assembly, taken along line 3-3 of FIG. 2, showing the diverter in a closed position relative to a first port.

FIG. 4 is a cross-sectional view of the diverter valve assembly, taken along line 4-4 of FIG. 3.

FIGS. 7A and 7B are isometric views of an exemplary embodiment of an exemplary valve shaft structure.

FIG. 10 is a side view illustrating an exemplary diventer valve installed in a top surface of a bathing installation.

FIG. 11 is a top view illustrating an exemplary diverter valve installed in an equipment compartment of a bathing installation with a pump and slide valves.

DETAILED DESCRIPTION

Figure 1:
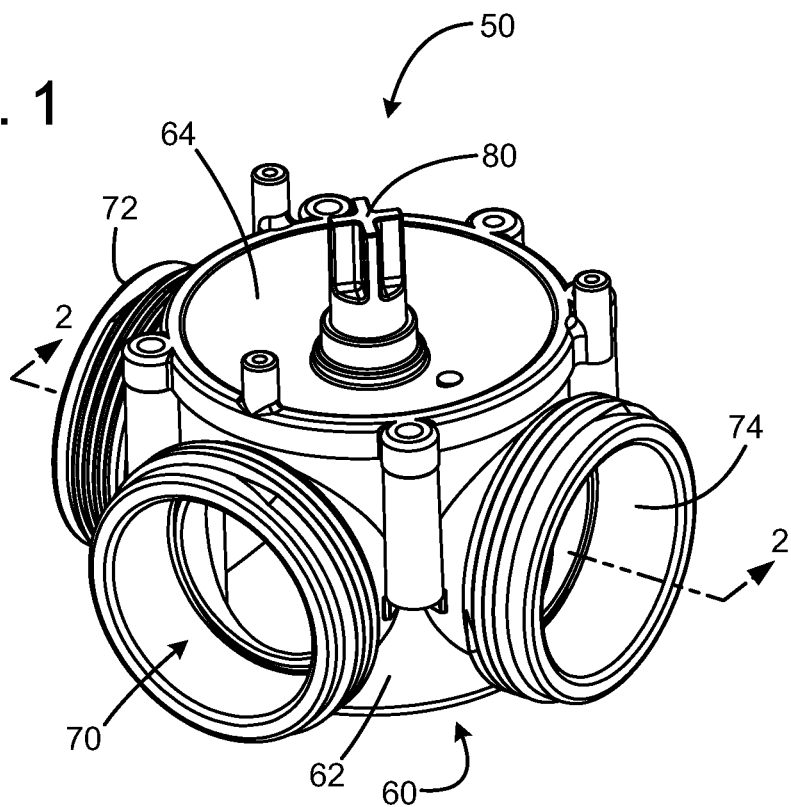
FIG. 1 is an isometric view of an exemplary diverter valve assembly.

In the following detailed description and in the several figures of the drawing, like elements are identified with like reference numerals. The figures may not be to scale, and relative feature sizes may be exaggerated for illustrative purposes.

An exemplary embodiment of a diverter valve system 50 is illustrated in FIGS. 1-9. The diverter valve system includes a valve body 60 including a housing 62 and a top cover 64, defining an internal chamber 66 having ports 70, 72, 74, and a first valve seat 72-1 associated with port 72 and a second valve seat 74-1 associated with port 74. In this exemplary embodiment, port 70 is always open, and the valve system permits flow to be diverted so that port 72 is open and port 74 is closed, or port 72 is closed and port 74 is open, or both ports 72 and 74 are open. The position of the diverter within the valve body may be set manually with a handle, or by a motor controlled by a controller programmed to move the diverter to set positions.

In this exemplary embodiment, the ports may be fabricated with threaded pipe fittings, so that the valve system may be connected in a system using pipe couplings or unions. By connecting the diverter valve with unions, the valve may be removed for servicing. Alternatively, the valve ports may be attached to connecting pipes by inserting pipes into the ports and gluing them in place, i.e. using pipe slip connections. The exemplary embodiment illustrated in FIGS. 1-9 provides both threaded pipe fittings and pipe slip couplings, to provide the user with the flexibility of either connection type. The respective ports 70, 72, 74 each have glue cups 70-2, 72-2, 74-2 formed at the internal ends of the slip couplings 70-3, 72-3, 74-3 (FIG. 3) to receive excess liquid glue used to attach pipes into the slip couplings and prevent the excess glue from entering the inner chamber of the valve and interfering with operation. An exemplary application for the valve system is in a bathing installation, e.g. whirlpool baths, spas or pools or the like. For example, bathing installations typically include several jets through which water is pumped by a pump, and in many cases, the capacity of the total number of jets may exceed the capacity of the pump to drive all the jets simultaneously to a rated flow rate per jet. Diverter valves may be used to connect the output from the pump to different sets of jets, each set connected to an output port of the diverter valve.

The valve body 60 includes a first vertically oriented stop shoulder or surface 68A adjacent the first valve seat 72-1, and a second vertically oriented stop shoulder or surface 68B adjacent the second valve seat 74-1.

The system 50 further includes a valve shaft structure 80 including an external shaft portion 80A extending through and outside the valve body and an internal shaft portion 80B positioned within the internal chamber. The valve shaft structure 80 is configured for rotation about a valve axis 82 through a range of motion, sufficient in this exemplary embodiment to provide somewhat larger than 180° rotational motion of the shaft structure 80 about its axis. The configuration of the valve may vary from that shown in FIG. 1. For example, the ports which are closable could be at 90 degree spacing, e.g. a 3 port valve with a port opposite port 70, or with port 72 as the always-open port, and ports 70 and 74 used as the closable ports. Alternatively, the diverter structure may be narrower, allowing more radial discharge ports. In other embodiments, the ports may be located at different angles than on 90 degree spacing.

The shaft structure 80 may be rotated by manual force, e.g. through a handle, or by a drive mechanism, e.g. a motor coupled to the external shaft portion 80A. FIG. 10 illustrates an exemplary embodiment of a valve operated by a manual handle or turn knob. FIG. 15 illustrates an exemplary embodiment of a diverter valve operated by a motor drive.

Figure 9:
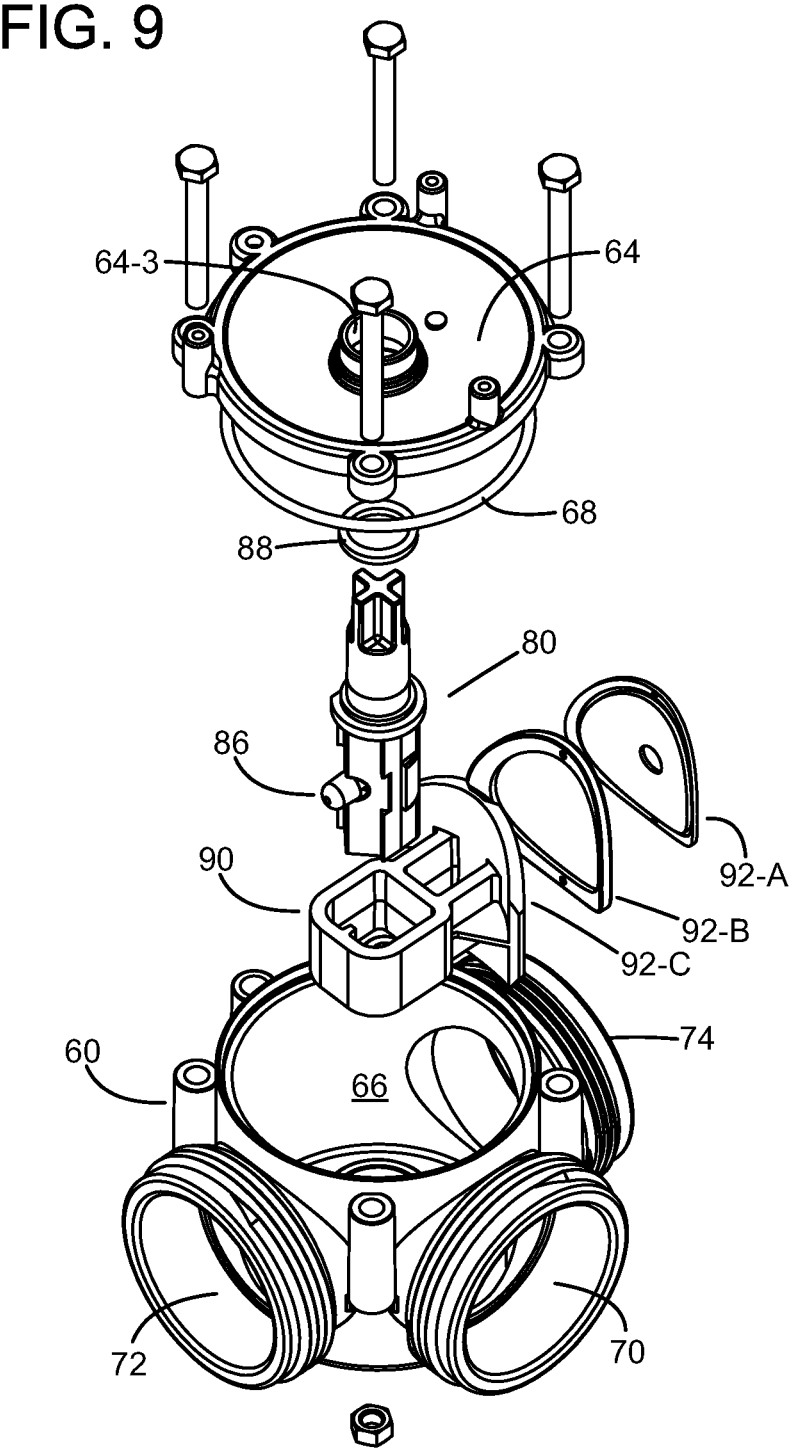
FIG. 9 is an exploded view of the diverter valve of FIG. 1.

The external portion 80A of the shaft structure 80 has a circular cross-section at region 80A-1 (FIG. 7A), and is configured to extend through an opening in the housing cover 64. A groove 80A-3 is provided to accept an o-ring seal 88 (FIG. 9). The outside end region 80A-2 of the shaft structure in this exemplary embodiment has an "X" configuration to couple to a motor drive or handle, but other coupling shaft configurations may alternatively be used.

The internal shaft portion 80B of the valve shaft structure 80 has a generally 5-sided configuration, including side surfaces 80-1, 80-2, 80-3, 80-4 and 80-5 (FIG. 7B), with opening 80B-1 formed in the end thereof. Sides 80-2 and 80-3 form right angles with side 80-1, and sides 80-4 and 80-5 define 45 degree angles with sides 80-2 and 80-3, respectively. Sides 80-4 and 80-5 meet at an edge 80-6. Sides 80-1 and 80-2 meet at rounded corner or fillet 80-7. Sides 80-1 and 80-3 meet at rounded corner or fillet 80-8. The rounded corners 80-7, 80-8 are employed as cam surfaces, as will be described below. Sides 80-2 and 80-4 meet at angled dog surfaces 84A, with a gap 84A-1 between the surfaces 84A. Sides 80-3 and 80-5 meet at angled dog surfaces 84B, with a gap 84B-1 between the surfaces 84B. Stop surfaces 84A and 84B are also defined by bosses on the shaft, and have a length less than the extent of the gaps 84A-1 and 84B-1.

Figure 2:
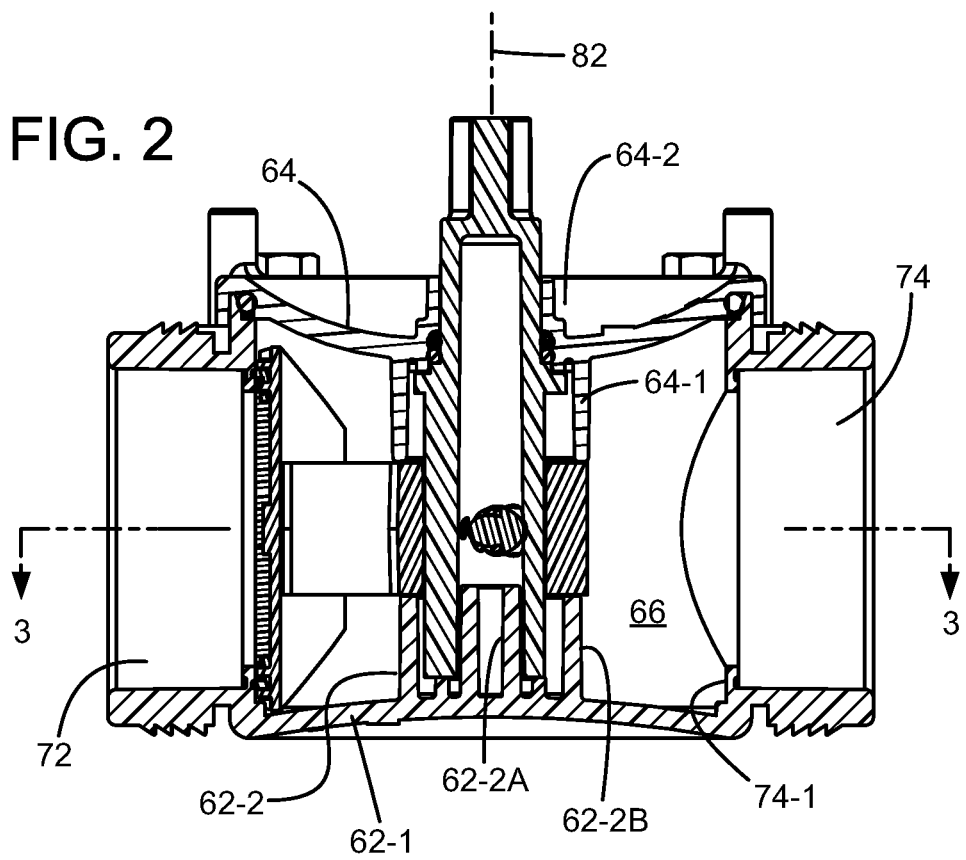
FIG. 2 is a cross-sectional view of the diverter valve assembly of FIG. 1, taken along line 2-2 of FIG. 1.
Figure 5A:
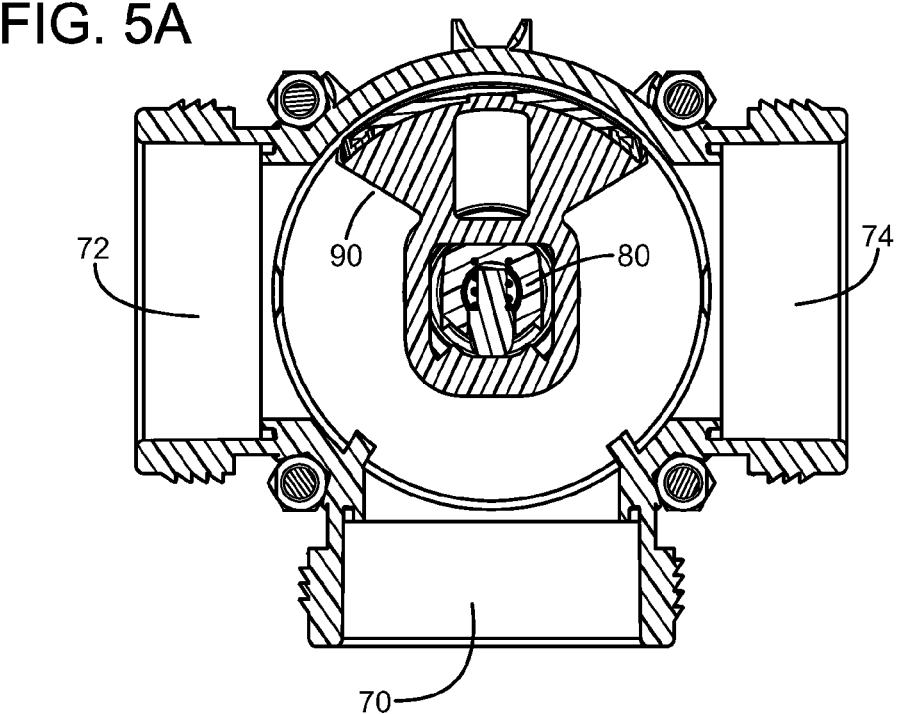
FIG. 5A is a cross-sectional view similar to FIG. 3, but showing the diverter in the open position.
Figure 5B:
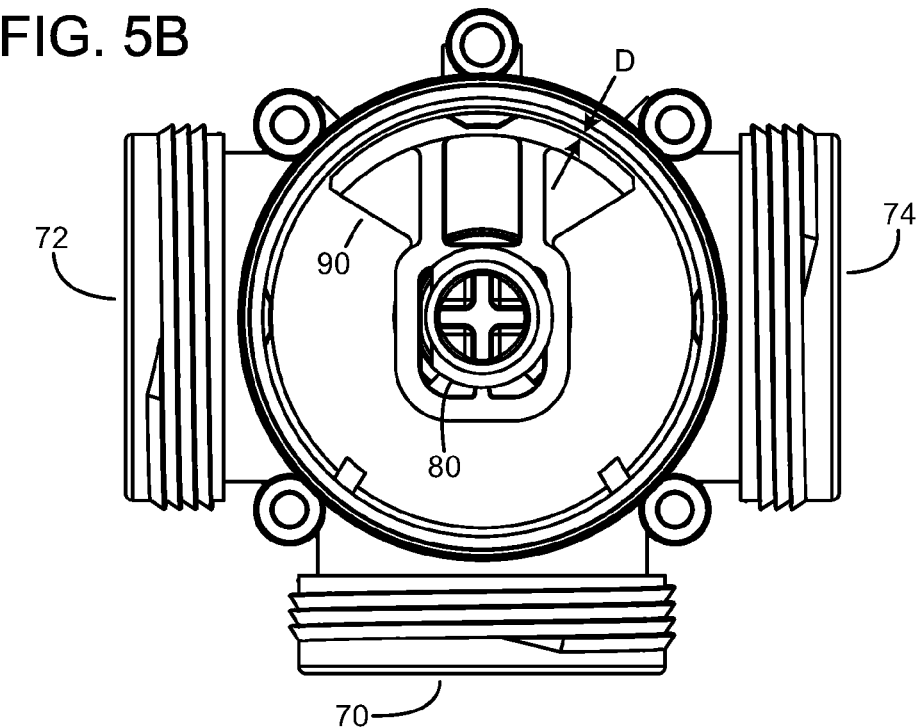
FIG. 5B is a top view taken with the cover removed, and showing the diverter in the open position, showing the clearance between the diverter and the valve housing.
Figure 6:
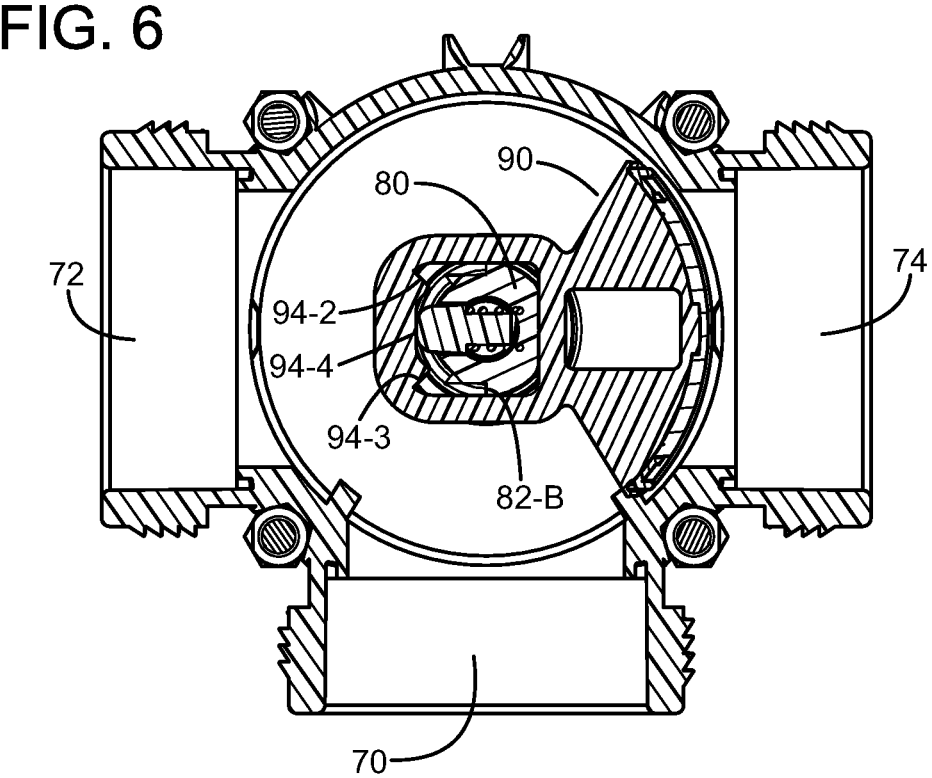
FIG. 6 is a cross-sectional view similar to FIG. 3, but showing the diverter at a second port, prior to the diverter moving to a sealed position.
Figure 6A:
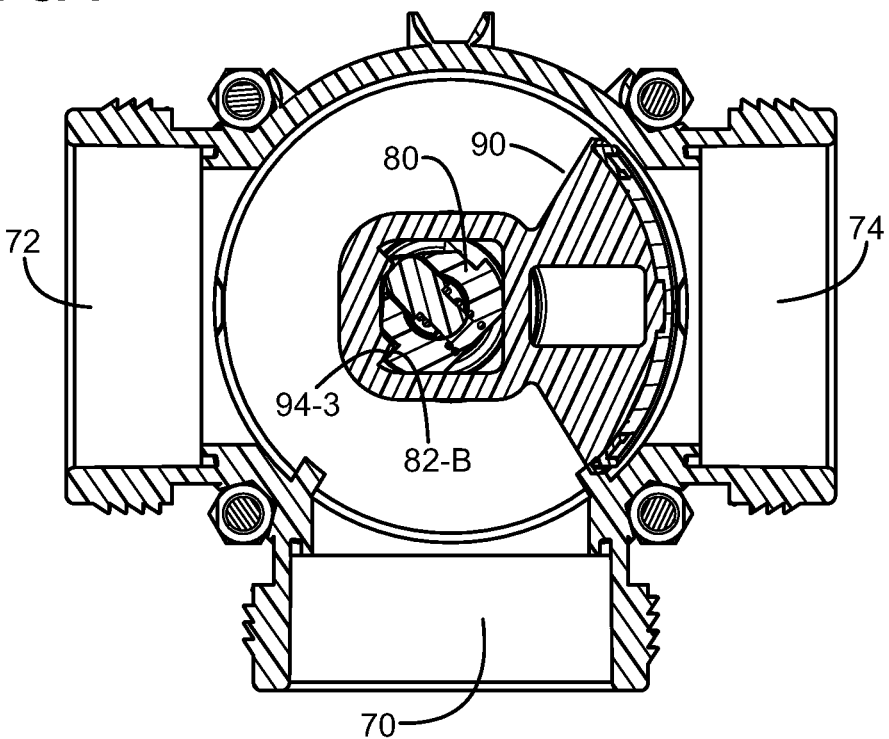
FIG. 6A shows the diverter in a sealed position at the second port.
Figure 8B:
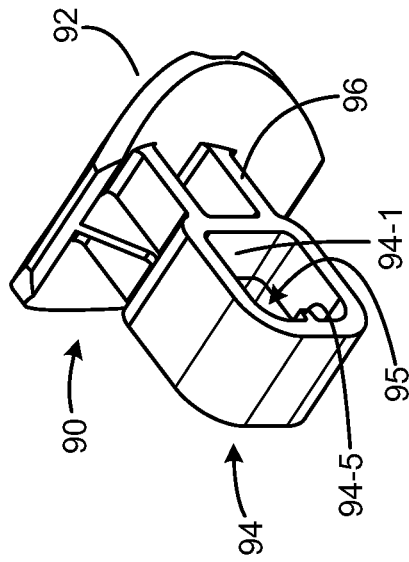
FIGS. 8A and 8B are isometric views of an exemplary valve seat structure.
Figure 8A:
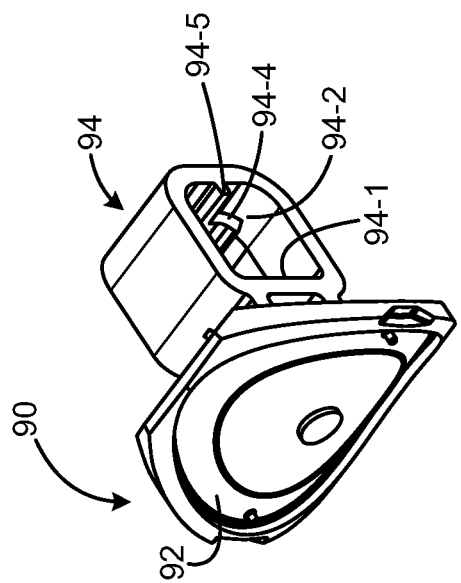

A diverter structure 90 includes a valve face portion 92 configured to seat against the first valve seat 72-1 when in a first rotational position, depicted in FIGS. 2-4, and against the second valve seat 74-1 when in a second rotational position, depicted in FIG. 6A. The valve seats 72-1 and 74-1 thus provide respective stationary seal surfaces surrounding the respective ports 72 and 74. A mounting portion 94 is configured to slip onto the internal shaft portion 80B of the valve shaft structure, and is connected to the face portion by connector portion 96. The valve face portion 92 in an exemplary embodiment may include a face plate member 92-A (FIG. 9), an elastomeric seal member 92-B, secured to back support 92-C, so that the seal member protrudes slightly from the face plate to make sealing contact with the valve seat portion of the body. The seal member may be used to make a highly effective liquid seal, preventing passage of virtually any liquid through a sealed port. In many applications, the seal member may be omitted, in cases in which passage of a small amount of liquid is acceptable. Many spa applications, e.g. those in which the jets are below the water line, may not require complete sealing, since the user would not notice a small amount of fluid flow through a jet connected to a closed port. If the liquid outlet is above the spa water line, such as a water feature, the use of an elastomeric seal may be desired to prevent leakage through a closed port.

The mounting portion 94 of the diverter structure 90 defines an enclosed, open region 95, which accepts the shaft structure internal portion 80B, and which is bounded on one side by flat surface 94-1. A saddle portion 94-4 is defined by the mounting portion 94 opposite the flat surface 94-1, and defines shoulder surfaces 94-2 and 94-3. A rib 94-5 extends above and below the saddle portion 94-4. The distance between the flat surface 94-1 and the saddle 94-4 is larger than the distance between the side 80-1 and edge 80-6 of the shaft portion 80B, to allow the mounting portion to fit onto the shaft portion.

The fillet 80-7 of the internal shaft structure 80B acts as a cam structure configured to push the mounting portion 94 toward the port 72 and the valve face portion into a sealing position against the first valve seat as the valve shaft structure 80 is rotated in a first direction (counterclockwise in reference to FIG. 3), bringing the leading edge of the diverter face portion 92 into contact with stop surface 68A. With the diverter face portion 92 constrained from further rotation in the first direction by stop surface 68A, the shaft structure continues to rotate, now with respect to the diverter structure as well as the body. As this rotation relative to the diverter structure continues, fillet 80-7 on the shaft structure bears against surface 94-1 of the diverter structure to push the diverter face portion 92 against the valve seat 72-1 in sealing contact, so that the face portion 92 closes the port 72. In so doing, a coil spring 86A inside a hollow cylindrical member 86 with a dome tip fitted into an opening 84 in the shaft is compressed against the base of the opening, applying a bias force opposing the pushing force exerted by the first cam surface. Rotation of the shaft structure continues until the first dog surfaces 84A on the shaft comes into contact with rib 94-5 on the diverter structure, and stop surface 82A contacts a corresponding shoulder surface 94-2 formed on the interior of the diverter structure.

The diverter structure may be moved from the first closed position against the first valve seat 72-1, to or through the open position (FIGS. 5A and 5B) to the second closed position against the second valve seat 74-1 (FIG. 6B). To accomplish this, the shaft structure 80 is rotated in a second direction (clockwise in the sense of FIG. 3). Initially, since the diverter face portion is in sealing contact with the valve seat 72-1, frictional forces between the valve seat and the diverter face will tend to oppose movement of the diverter structure 80 with the shaft structure, so that the shaft rotates relative to the diverter structure, until the fillet 80-7 on the shaft structure moves out of contact with the flat surface 94-1 on the interior of the diverter structure. As this happens, the bias force applied by the cylindrical member, now unopposed by a pressing force, pushes the diverter face away from and out of contact with the valve seat 72-1. Now, with the diverter clear of the housing, as the shaft is rotated further, the diverter structure 80 rotates with the shaft, proceeding to the open position (FIG. 5A) intermediate the ports 72 and 74, and then on to the port 74. Rotation of the shaft may be stopped, so that the three ports 70, 72 and 74 may be in fluid communication, permitting flow into/out of all three ports. Rotation of the diverter while the face surface is clear of the housing substantially reduces the risk of dirt, grit or other particulates in the water being caught between the adjacent surfaces and freezing up or impairing operation of the valve system. An exemplary clearance D between the diverter face and the housing surface is visible in FIG. 5B, a top view taken with the top cover removed.

With the diverter structure at or passing through the open position (FIG. 5A), further rotation of the shaft structure 80 will carry the diverter structure 90 to the second closed position at port 74. As described above regarding the movement to the first closed position, the leading edge of the diverter structure rotates until coming into contact with the stop surface 68B of the housing 62 (FIG. 6). Further rotation of the shaft structure with the diverter structure stopped against surface 68B results in the fillet 80-8 (acting as a second cam structure) on the shaft structure bearing against the flat interior surface 94-1 of the diverter structure to push the diverter face portion 92 against the valve seat 74-1 in sealing contact, so that the face portion 92 closes the port 74. In so doing, the spring 86A inside the hollow cylindrical member 86 is compressed, applying a bias force opposing the pushing force exerted by the second cam surface. Rotation of the shaft structure continues until a second dog surface 84B on the shaft comes into contact with rib 94-5 on the diverter structure, and stop surface 82B on the shaft comes into contact with a corresponding shoulder surface 94-3 formed on the interior of the diverter structure (FIG. 6A).

The bias structure, defined in this exemplary embodiment by coil spring 86A and hollow cylindrical member 86, is coupled between the mounting portion 94 and the shaft structure, and is configured to apply a bias force tending to push the valve face portion toward the internal shaft portion 80B, such that the valve face portion is pushed toward the internal shaft portion and out of contact with either the first or second valve seat when the cam structure 82A, 82B is in a release orientation relative to the mounting portion of the valve structure. Other bias structures may alternatively be used. For example, a solid elastomeric member may be employed, such as natural or synthetic rubber or the like.

Other mechanisms for pulling the diverter structure away from the housing wall surface to allow movement to another diverter position, and to push the diverter face against a port opening to seal the port, may alternatively be employed.

The body structure 60 includes features to support and secure the shaft structure 80 in the body structure for rotational movement. The housing 62 includes a base portion 62-1, with a boss structure 62-2 formed of inner and outer cylindrical bosses 62-2A and 62-2B. The base of the shaft structure 80 has a circular bore or opening 80B-1 formed therein, whose diameter is slightly larger than the outer diameter of inner boss 62-2A. The inner diameter of the outer boss 62-2B is selected to be larger than the largest outer cross-sectional dimension of the base of the shaft structure, to accept the base of the shaft structure inside the outer boss. These features constrain the base of the inner portion of the shaft structure while permitting rotation.

The body 60 further includes a cover 64, which may be secured to the housing 62 by threaded fasteners, with an o-ring or gasket seal 68 at an interface between the cover and housing. The cover includes a central opening 64-3 defined in lower and upper cylindrical boss portions 64-1 and 64-2. The lower boss portion accepts the upper or external portion of the shaft during assembly, with the shoulder portion 80C of the shaft captured against the bottom surface of the lower boss and an o-ring seal 88. When assembled, the shaft structure is constrained from axial movement by the lower boss portion 64-1 of the cover and the outer boss 62-2B. In an exemplary embodiment, the housing 62 and cover 64 may be fabricated of PVC, the shaft 80 of glass-filled ABS, and the diverter structure 90 of an engineering plastic such as glass-filled Noryl®, thus providing a rigid diverter structure with a rigid diverter face portion 92. Of course, other materials may alternatively be employed.

A feature of an exemplary embodiment of the diverter valve is that the diverter is pulled away from the inner surface of the valve body during rotation, reducing drag and easing the rotation. This feature significantly reduces binding of the valve diverter with sand or grit during rotation. Moreover, with the diverter moved away from the valve body, the valve seal surfaces are self cleaned during rotation by water flow through the valve. A unionized connection of the diverter valve in a spa application is unique. In the past, diverter valves typically have been mounted on the top deck of the spa or bath, so the handle is above water line and by the user's shoulder/ear. An exemplary embodiment of the new valve when motorized can be mounted in the service compartment of the spa, making it easily serviceable, and opening up space on top of the spa to use for other features and enhancement of spa. Also the remote placement removes the noise of water flowing through the valve near the user's head. Further, by unionizing the valve, and placing gate valves or slice valves on opposite sides of the valve for isolation, the valve can be removed from the water path without completely draining the spa.

Figure 13:
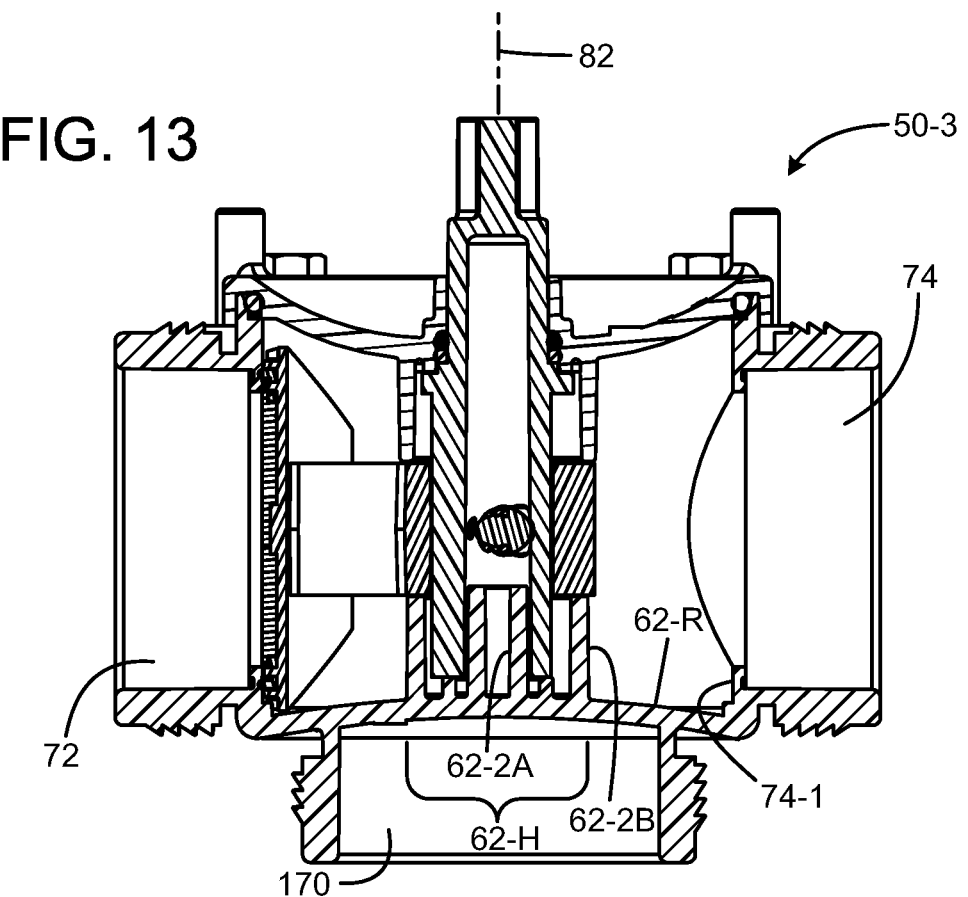
FIGS. 13 and 14 illustrate an exemplary alternate embodiment of a diverter valve.
Figure 14:
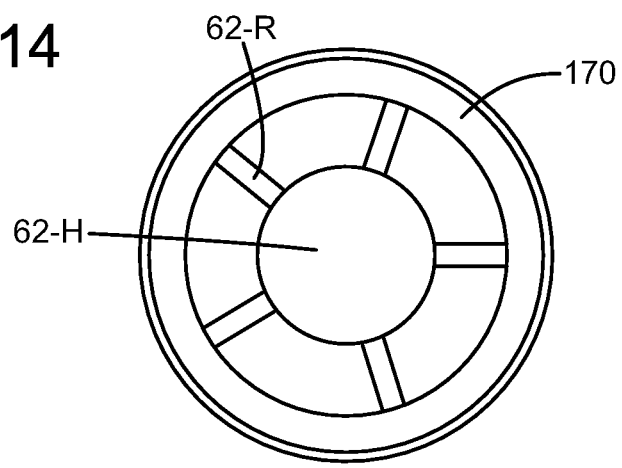

FIG. 10 illustrates an exemplary embodiment of a diverter valve 50-1 mounted just below a top surface 12 of a bathing installation, e.g. a spa tub. The diverter valve may be similar to valve 50 depicted in FIG. 1, except that the center port opens into the bottom of the valve housing, i.e. axially rather than radially. (An example of this alternate valve is illustrated in FIGS. 13-14.) The valve 50-1 is actuated by a manually operated handle or turn knob H. In this example, the valve ports may be attached to connecting pipes 10-1, 10-2 and 10-3 by insertion of ends of the pipes into the pipe slip fittings at the ports, and gluing them in place.

FIG. 11 illustrates another exemplary embodiment of a diverter valve 50-2, in this case installed as a component of a water flow system including a pump system and a recirculating water flow path, which may be employed in a bathing installation such as a spa, whirlpool bath or pool. In this case, the diverter valve may be located in the water flow path downstream of the pump, and actuated by a motor drive (shown in FIG. 12). The diverter valve is connected in the water flow path by union connections to permit ready removal and replacement of the valve. In this case, the ports are connected to pipes 10-1, 10-2 and 10-3 by unions 14-1, 14-2 and 14-3 which threadingly engage threads formed on the ports as depicted in FIG. 1, for example. The diverter valve 50-3 can be operated to divert water from the pump into either pipe 10-1 or 10-2, or to both pipes. The pipe 10-2 is connected to an outlet of the pump 20 by a union 22-2. An inlet of the pump is connected to pipe 10-4 by a union 22-1. Slice valves 16-1, 16-2 and 16-3 are connected in pipes 10-1, 10-2 and 10-4, and may be closed to permit removal and installation of the assembly of the diverter valve 50-2 and pump 20 without the need to drain the water installation. This is a significant benefit.

Figure 12:
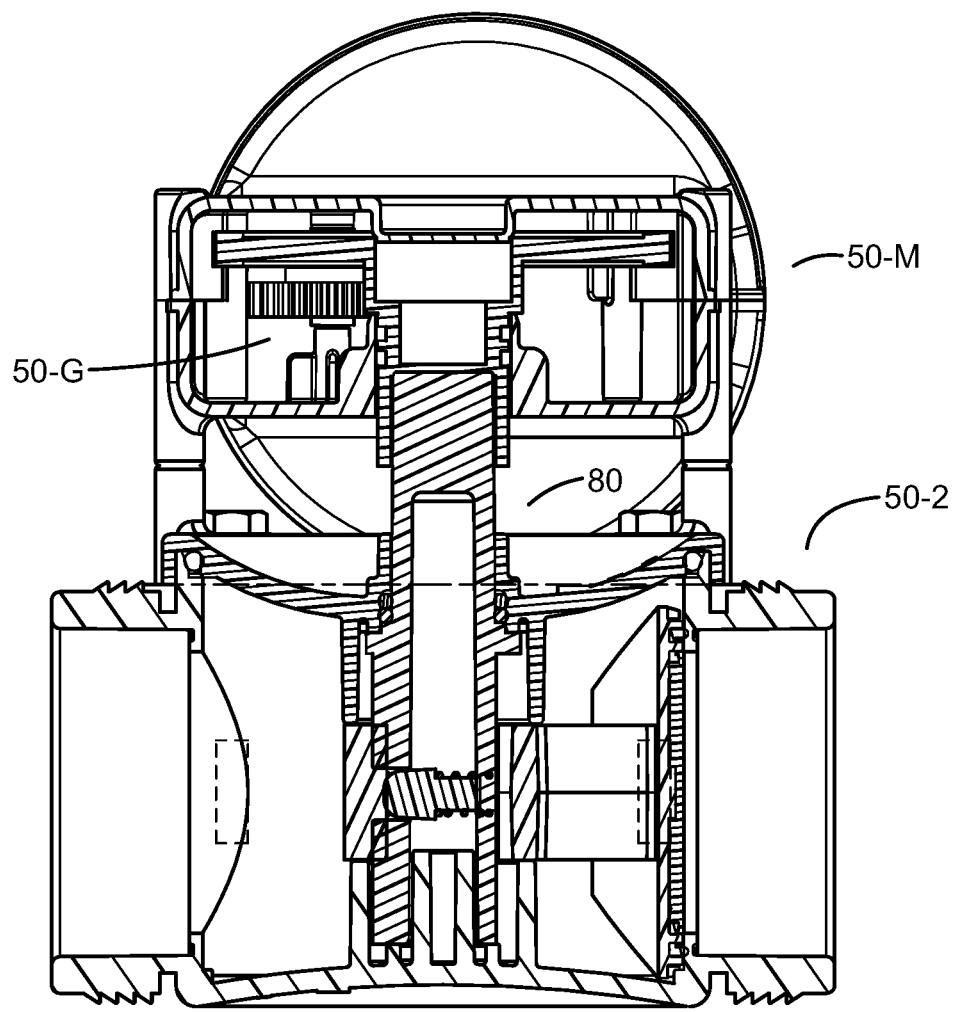
FIG. 12 illustrates an exemplary embodiment of a diverter valve with a motor drive.

FIG. 12 illustrates an exemplary embodiment of a motorized diverter valve 50-2. In this embodiment, the shaft 80 of the valve 50-2 is connected through a right angle gear train 50-G to a motor 50-M. The motor may be controlled by the bathing installation controller in response to a spa setting, or a motor controller and a switch actuated by the user to move the diverter valve from one position to another.

FIGS. 13-14 illustrates another exemplary embodiment of a diverter valve 50-3, in which one port 170 enters the housing in an axial direction, along axis 82, and two other ports 72, 74 are radially positioned opposite each other. In this case, port 170 may be the inlet port, and ports 72, 74 outlet ports. The lower shaft support structure (including inner and outer bosses 62-1 A and 62-1 B) may be supported on a hub 62-H, by a plurality of spokes or ribs 62-R extending radially from the hub to the housing wall, to allow water flow through the open regions between the hub and the ribs. Water may then be diverted to one of ports 72, 74, or to both ports, depending on the position of the diverter structure.

Although the foregoing has been a description and illustration of specific embodiments of the subject matter, various modifications and changes thereto can be made by persons skilled in the art without departing from the scope and spirit of the invention as defined by the following claims.

What is claimed is:

1. A valve system, comprising:
   a valve body defining an internal chamber having a plurality of ports including a first port, the valve body defining a stationary first seal surface surrounding the first port;
   a valve shaft structure including an internal shaft portion positioned within the internal chamber, the valve shaft structure configured for rotation about a valve axis through a range of motion;
   a diverter structure actuated by the valve shaft structure for movement about the valve axis, including a rigid diverter face portion and a mounting portion configured to mount on the internal shaft portion of the valve shaft structure;
   the valve shaft structure configured to apply a seal force on the mounting portion to push the rigid diverter face portion into a sealing position relative to the first port in contact with said first seal surface of the valve body, as the valve shaft structure is rotated in a first direction, to remove the seal force on the mounting portion as the valve shaft structure is rotated in a second direction and to push the rigid diverter face portion away from the first port and out of contact with said first seal surface and with internal surfaces of the valve body, and to carry the diverter structure with the valve shaft structure as the valve shaft structure is rotated in the second direction with a clearance distance between the rigid diverter face portion and inner surfaces of the valve body and without any portion of the rigid diverter face portion in contact with the inner surfaces of the valve body during said rotation to reduce binding with dirt or grit and to allow self cleaning of the valve diverter face portion by fluid flow through the valve; and wherein the rigid diverter face portion is configured to cover the first port in said sealing position;

wherein the plurality of ports further includes a second port and a third port, the first and second ports disposed at radially separated positions relative to the shaft structure, and the third port is an inlet port disposed at an axial position relative to the shaft structure, and in axial alignment with said valve axis; and wherein the valve body includes a housing with a bottom hub portion supported by a plurality of ribs extending radially from the hub portion to a housing wall with open regions between the ribs, and a removable top cover having an open top shaft support boss, the bottom hub portion including a lower shaft support boss, wherein the top shaft support boss and the lower shaft support boss support the shaft structure for rotation, and wherein the first port is fluidically coupled to the open regions to allow fluid flow through the open regions between the hub and the ribs, and fluid may be diverted from the first port to one of the second or third ports or to both ports in dependence on the position of the diverter structure.

2. A diverter valve system for a bathing installation, configured to control a water flow through the bathing installation, comprising:

a valve body defining an internal chamber having at least first, second and third ports, and a first valve seat surrounding the first port and a second stationary valve seat surrounding the second port;

a valve shaft structure including an external shaft portion extending outside the valve body and an internal shaft portion positioned within the internal chamber, the valve shaft structure configured for rotation about a valve axis through a range of motion;

a diverter structure including a rigid diverter face portion configured to seat against and in contact with the first valve seat when in a first rotational position and against and in contact with the second valve seat when in a second position, and a mounting portion configured to mount on the internal shaft portion of the valve shaft structure;

the valve shaft structure including a cam structure configured to push the rigid diverter face portion into a first sealing position against the first valve seat as the valve shaft structure is rotated in a first direction, and to push the rigid diverter face portion into a second sealing position against the second valve seat as the valve shaft structure is rotated in a second direction;

a bias structure coupled between the mounting portion and the internal shaft portion and configured to apply a bias force tending to push the diverter face portion toward the internal shaft portion, such that the diverter face portion is out of contact with either said first or said second valve seat and with internal surfaces of the chamber when the cam structure is in a release orientation relative to the mounting portion of the diverter structure and without any portion of the rigid diverter face portion in contact with the inner surfaces of the valve body when the cam structure is in said release orientation to reduce binding with dirt or grit and to allow self cleaning of the valve diverter face portion by water flow through the valve; and wherein the rigid diverter face portion is configured to cover the first port in said first sealing position to allow water flow between the second and third ports while blocking flow through the first port and to cover the second port in said second sealing position to allow water flow between the first and third ports while blocking flow through the second port.

3. The valve system of claim 2, wherein the valve body includes a threaded pipe coupling for each of the plurality of ports.

4. The valve system of claim 2, wherein the first, second and third ports are disposed at radially separated positions relative to the shaft structure.

5. The valve system of claim 2, wherein the valve body includes a housing with a bottom hub portion and a removable top cover having an open top shaft support boss, the bottom hub portion including a lower shaft support boss, and wherein the top shaft support boss and the lower shaft support boss support the shaft structure for rotation.

6. The valve system of claim 2, wherein said first port is an inlet port, and the diverter structure may be positioned to selectively close said second port while leaving said third port open, to close said third port while leaving said first port open, and to leave both ports open for water flow.

7. The system of claim 2, wherein the bias structure and the cam structure are configured to position the rigid diverter face portion at a clearance distance D from the internal surfaces of the chamber with the cam structure in the release orientation and the rigid diverter face portion is positioned between the first and second ports.

8. The valve system of claim 2, further comprising a coupling on the shaft structure for connection to an actuating system to apply a rotational force to the shaft.

9. The valve system of claim 8, wherein the actuating system includes an electric motor.

10. The valve system of claim 8, wherein the actuating system is a manually operable handle.

11. The valve system of claim 2, wherein the first and second ports are disposed at radially separated positions relative to the shaft structure, and the third port is an inlet port disposed at an axial position relative to the shaft structure, wherein the third port is in axial alignment with said valve axis.

12. The system of claim 11, wherein the valve body includes a housing with a bottom hub portion supported by a plurality of ribs extending radially from the hub portion to a housing wall with open regions between the ribs, and a removable top cover having an open top shaft support boss, the bottom hub portion including a lower shaft support boss, wherein the top shaft support boss and the lower shaft support boss support the shaft structure for rotation, and wherein the first port is fluidically coupled to the open regions to allow fluid flow through the open regions between the hub and the ribs, and fluid may be diverted from the first port to one of the second or third ports or to both ports in dependence on the position of the diverter structure.

13. The system of claim 11, wherein the internal valve shaft portion comprises a plurality of surface features, including spaced first and second dog surfaces, each configured to engage a protruding rib extending from an interior facing surface of the mounting portion of the diverter structure as the valve shaft structure is rotated through the range of motion in the respective first and second directions and stop rotation of the diverter structure relative to the internal valve shaft portion.

14. A water flow system for a bathing installation, including a pump, a recirculating water flow path, and a diverter valve system according to claim 2.

15. The system of claim 14, wherein the valve body includes a threaded pipe coupling for each of the plurality of ports, and the plurality of ports are connected to pipes comprising the water flow path by a plurality of union connections to permit removal and replacement of the diverter valve system in the water flow system.

16. The system of claim 15, further comprising a union connection for connecting an inlet port of the pump to the water flow path, and a plurality of shutoff valves in the water path, wherein the shutoff valves are positioned so that the pump and diverter valve system may be removed and replaced when the shutoff valves are closed without draining the bathing installation.

\* \* \* \* \*